April 27, 1965 R. W. CALKINS 3,180,465
FRICTION ENERGIZED CLUTCH MECHANISM
Filed Oct. 11, 1962 2 Sheets-Sheet 1
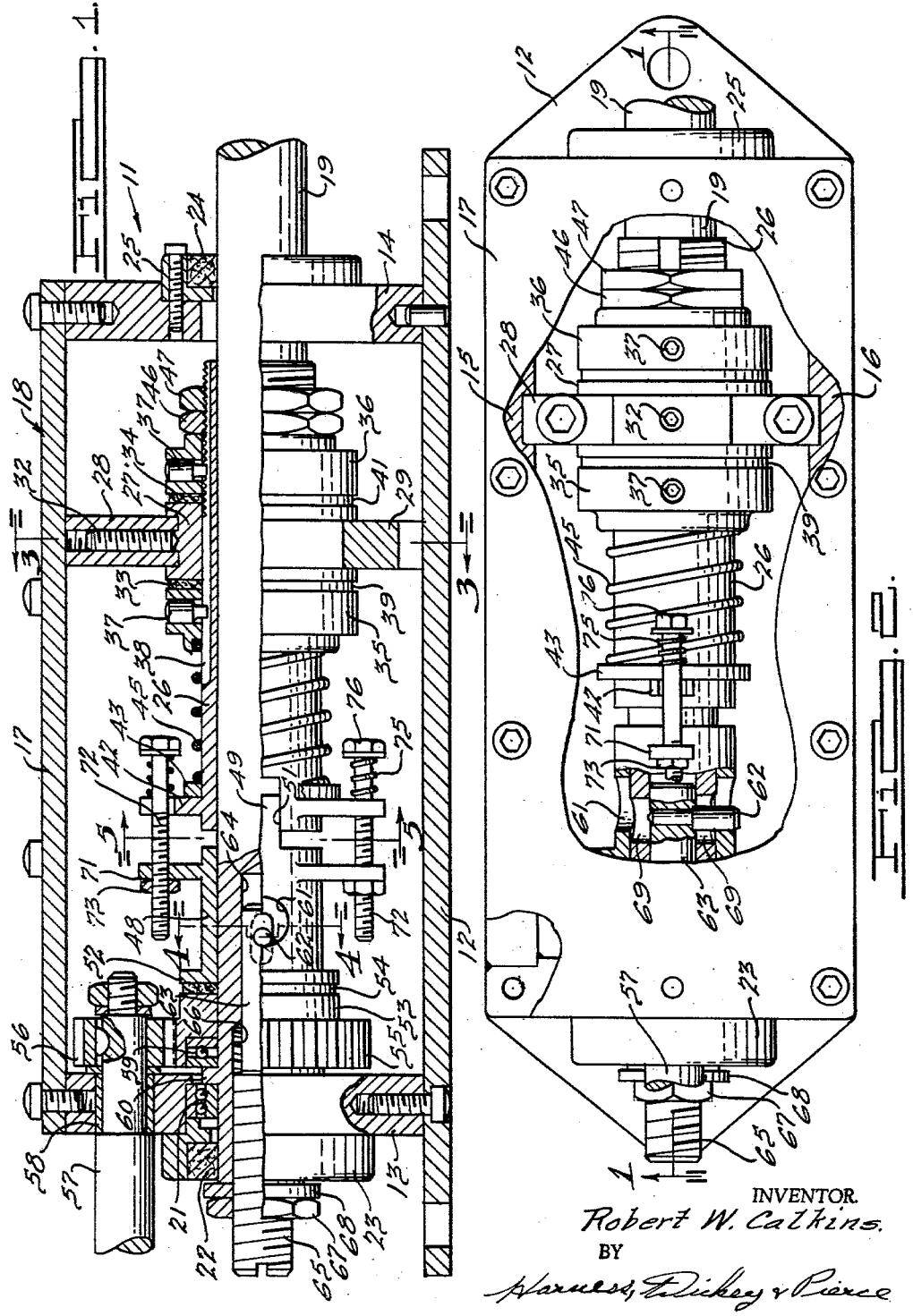
INVENTOR.
Robert W. Calkins.
BY
Harness, Dickey & Pierce
ATTORNEYS.

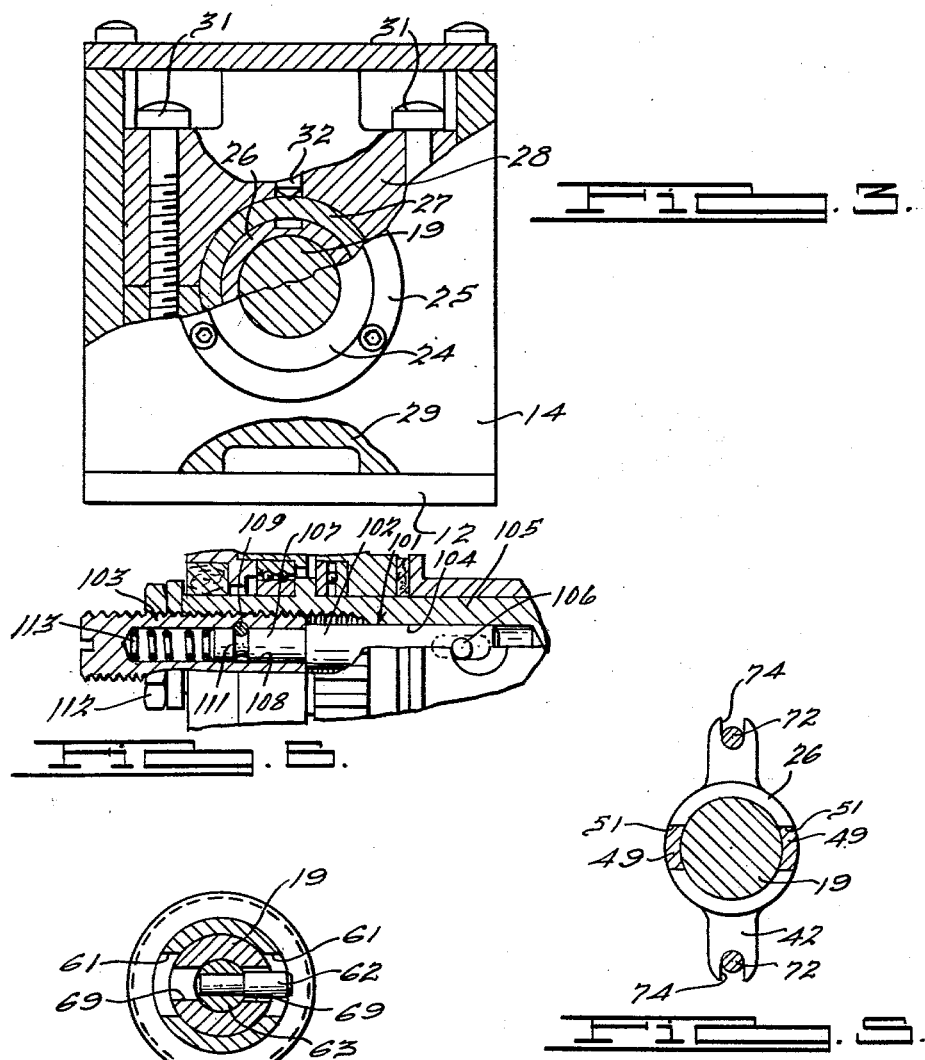

United States Patent Office 3,180,465
Patented Apr. 27, 1965

3,180,465
FRICTION ENERGIZED CLUTCH MECHANISM
Robert W. Calkins, 611 Carolina Ave., Marysville, Mich.
Filed Oct. 11, 1962, Ser. No. 229,938
9 Claims. (Cl. 192—31)

This invention relates to coupling mechanisms, and more particularly to mechanisms for automatically coupling a driving member to a driven member when the driving member is rotated, and uncoupling the members when the driving member is halted or slightly reversed.

It is an object of the invention to provide a novel and improved coupling mechanism of this nature which is quick-acting, of durable construction, and adjustable to vary the lost motion during coupling and uncoupling as well as the resistance to driving member rotation.

Other objects, features, and advantages of the present invention will become apparent from the subsequent description, taken in conjunction with the accompanying drawings, in which:

FIGURE 1 is a side elevational view, partly sectioned along the line 1—1 of FIGURE 2, and showing the components of the coupling mechanism;

FIGURE 2 is a top plan view of the couping mechanism with the cover partially broken away and with parts sectioned, showing the engagement of the clutch operating pin with the input clutch element sleeve;

FIGURE 3 is a partial cross-sectional view in elevation taken along the line 3—3 of FIGURE 1 and showing the journal bearing for the friction bearing supporting sleeve;

FIGURE 4 is a cross-sectional view taken along the line 4—4 of FIGURE 1 and showing another view of the interrelationship between the clutch operating pin and the input clutch element sleeve;

FIGURE 5 is a cross-sectional view taken along the line 5—5 of FIGURE 1 and showing the ears on the friction bearing supporting sleeve for supporting the clutch disengaging springs; and FIGURE 6 is a fragmentary cross-sectional view in elevation showing a modified construction for the adjusting rod.

Brifly, the illustrated embodiment of the invention comprises a driving shaft which may be rotated in either direction, for example, by the manual steering wheel of a boat steering mechanism. A radially extending pin is mounted on the input shaft and extends through a circular opening in a sleeve carried by the shaft. This sleeve is engageable with one side of a friction disc, on the other side of which is a pinion connected to an output shaft. In other words, the sleeve through which the pin extends and a portion of the pinion form input and output elements, respectively, of a friction clutch.

A second sleeve is rotatably mounted on the input shaft, and means are provided between the two sleeves for permitting axial movement therebetween but keying the sleeves together for rotational movement. Spring means are also provided between the sleeves for urging the sleeve which carries the input clutch element away from the friction disc.

A pair of friction bearings are keyed to the second-mentioned sleeve and are frictionally held against opposite sides of a journal bearing for this sleeve, spring means urging the friction bearings toward the journal bearing. This frictionally holds the input clutch element sleeve against rotation.

In operation, the clutch will normally be held in uncoupled condition by the clutch disengaging spring means between the two sleeves. However, upon initial rotation of the input shaft, the pin will cam the input clutch element sleeve toward the output clutch element, thus in affect connecting the input and output shafts. The relative rotational movement between the pin and input clutch element sleeve will occur because the input clutch element sleeve is frictionally held against initial rotation by the two friction bearings described above. The strength of engagement of these friction bearings with the stationary journal bearing may be adjusted, so that the effort required to rotate the input shaft may be preselected. The pin may also be axially adjusted, so that the initial amount of rotation required to couple the input and output shafts may also be preselected. The spring means between the two sleeves urging the clutch input element toward its disengaging position may likewise be adjusted.

Rotation of the output shaft will continue as long as the input shaft continues to be rotated. When the input shaft rotation is stopped, the output shaft rotation will stop, and as soon as the input shaft is backed off slightly, the spring means between the sleeves will cause the clutch to become disengaged.

Referring more particularly to the drawings, the coupling mechanism is generally indicated at 11 and comprises a flat base 12, a pair of end plates 13 and 14, side plates 15 and 16, and a cover 17, these parts forming a housing generally indicated at 18. A power input shaft 19 is disposed within housing 18 and extends through end plates 13 and 14. A self-aligning combined radial and thrust bearing 21 is carried by plate 13, an oil seal 22 being carried by a retainer 23 outwardly of bearing 21. A second oil seal 24 is carried by a retainer 25 attached to end plate 14.

A friction bearing supporting sleeve 26 is rotatably mounted on shaft 19 within housing 18, sleeve 26 being rotatably supported by a journal bearing 27 carried by a pair of retainer sections 28 and 29 secured within housing 18 by bolts 31, as seen in FIGURE 3. Bearing 27 is held against rotation by a set screw 32 threadably mounted within retainer section 28, and has a pair of oppositely facing radial friction surfaces 33 and 34, respectively, as seen in FIGURE 1. A pair of friction bearings 35 and 36 are mounted on sleeve 26 on opposite sides of bearing 27. Each friction bearing has a member 37 mounted thereon, this member extending inwardly and being disposed within a key slot 38 in sleeve 26, thus permitting relative axial movement between each friction bearing and sleeve 26, but preventing relative rotation between the friction bearings and sleeve. Friction discs 39 and 41 are disposed between bearings 35 and 36 and the opposite facing surfaces 33 and 34, respectively, of bearing 27.

A pair of oppositely extending ears 42 are provided on the end of sleeve 26 between bearings 21 and 27, and a spring retainer 43 is supported by shoulder 42 and in turn supports a helical compression spring 45 surrounding sleeve 26, the other end of spring 45 engaging friction bearing 35. A nut 46 is threadably mounted on the end of sleeve 26 opposite spring retainer 43, nut 46 having a jam nut 47 and being rotatable to adjust the amount of compression in spring 45 and thus the forces exerted by friction bearings 35 and 36 on bearing 27. By adjusting nut 46, it is thus possible to preselect the amount of torque necessary to overcome static friction and cause sleeve 26 to rotate within bearing 27.

An input clutch element in the form of a sleeve 48 is rotatably mounted on shaft 19 between sleeve 26 and bearing 21. Sleeve 48 is provided with a pair of axial extensions 49, seen in FIGURE 5, which are slidably disposed within a pair of recesses 51 in sleeve 26. The other end of sleeve 48 carries a shoulder 52 having a clutch surface facing a similar surface on an output clutch element 53, a friction disc 54 being disposed between the clutch elements. Output clutch element 53 carries a pinion 55 meshing with a gear 56 keyed to an output shaft 57, the output shaft being mounted in a bearing 58 carried by end plate 13 above bearing 21. An antifriction thrust bearing 59 is provided between pinion 55 and a shoulder 60 on shaft 19 adjacent bearing 21.

Sleeve 48 is provided with two oppositely disposed circular radial apertures 61, as seen in FIGURE 4. A pin 62 is carried by shaft 19 and extends radially through one aperture 61. More particularly, an adjusting rod 63 is movably mounted within a bore 64 in the end of shaft 19 adjacent bearing 21. Rod 63 has a threaded portion 65 mounted within a threaded bore 66 in the end of shaft 19, a jam nut 67 and a washer 68 being mounted on threaded portion 65. Pin 62 is removably mounted in rod 63 and is thus adjustable in an axial direction with respect to shaft 19, since it may be temporarily removed from rod 63 to permit one or more half turns of the rod, the pin then being remounted in rod 63 through one of apertures 61. Shaft 19 has a pair of elongated slots 69 through one of which pin 62 will extend when mounted in rod 63, the slots thus permitting the aforementioned axial adjustment.

A pair of ears 71 are provided on sleeve 48, these ears carrying a pair of tension adjusting bolts 72 which are threaded therein and are axially adjustable by nuts 73. Bolts 72 extend through slots 74 in the outer ends of the ears 42. Helical compression springs 75 are disposed on bolts 72 between the heads 76 thereof and ears 42, springs 75 thus serving to urge sleeve 48 to the right in FIGURES 1 and 2, that is, into a clutch disengaging position. This position is limited by the engagement of the left-hand portion of one aperture 61 with pin 62. Slots 51 are of sufficient length to permit the disengaging movement to take place without interference.

In operation, the components of unit 11 will be so adjusted that when in its normal or disengaged position, input shaft 19 will be disengaged from output shaft 57 by virtue of the fact that input clutch element 48 is disengaged from output clutch element 53. Should it be desired to rotate output shaft 57, input shaft 19 will be rotated. This will cause rotation of pin 62 which will move from its neutral position as shown in FIGURE 1 and engage the curved surface of the aperture 61 through which it extends. Sleeve 48 will initially be held against rotation by virtue of the fact that it is keyed to sleeve 26, the latter being frictionally held by the engagement of friction bearings 35 and 36 with journal bearing 27 through friction discs 39 and 41.

Sleeve 48 will therefore be cammed to the left as seen in FIGURE 1, urging its portion 52 against friction disc 54 which in turn will engage output clutch element 53.

When sufficient torque has been exerted on shaft 19 to overcome the frictional resistance of friction discs 39 and 41, sleeves 48 and 26 will begin to rotate with shaft 19. Since the clutch comprising elements 48 and 53 are engaged, rotation of sleeve 48 will cause rotation of output shaft 57 through pinion 55 and gear 56.

Rotation of output shaft 57 will continue only so long as input shaft 19 continues to be rotated. Stopping of shaft 19 will cause shaft 57 to stop, but as long as torque is maintained on shaft 19, clutch elements 48 and 53 will stay in engagement. However, as soon as shaft 19 is backed off a little in the opposite direction, pin 62 will return to its centered position in aperture 61, and springs 75 will cause disengagement of input clutch element 48 from output clutch element 53. Output shaft 57 will thus be free to move independently of input shaft 19. This may be of advantage, for example, in manual steering mechanisms for boats in which it is desired that the rudder be permitted to return to its centered position after a turn without having to return the wheel to a neutral position.

The above-described operation will pertain to rotation of input shaft 19 in either direction.

The presence of the adjustable features described above is particularly advantageous in that the degree of lost motion or response lag, and the resistance or "feel" of the input shaft can be readily preselected. For example, adjustment of pin 62 will determine the lost motion between input shaft 19 and sleeve 48 which in turn determines the lost motion to output shaft 57. This adjustment, as well as the adjustment of springs 75, will also determine the disengagement sensitivity of the device, that is, the degree of back-off needed before input shaft 19 is uncoupled from output shaft 57. Adjustment of the pressure of friction bearings 35 and 36 on friction discs 39 and 41, respectively, will determine the resistance felt by the operator of shaft 19 to rotation of the system including the input and output shafts. This adjustment will also control the engaging pressure between the clutch elements, since it determines the camming force which must be exerted by pin 62 before rotation can take place.

FIGURE 6 shows a modified form of the adjusting rod generally indicated at 101. The rod is composed of two parts, one part being indicated at 102 and the other at 103. Part 102 is of smooth cylindrical shape and is slidably mounted within a bore 104 of input shaft 105. A pin 106 is fixed to part 102 and extends outwardly therefrom in the same manner as pin 62 of the previous embodiment. Part 102 is provided with a narrower end portion 107 rotatably mounted in a bore 108 of part 103, the parts being connected by a pin 109 in a hole drilled in part 103, pin 109 passing through a groove 111 in section 107. Part 103 is threadably mounted in shaft 105 and is securable in selected rotative positions by a lock nut 112. A helical compression spring 113 is disposed within bore 108 and engages the end of part 102, urging it to the right and thus removing axial play between parts 102 and 103.

In operation of the adjusting feature of FIGURE 6, pin 106 may be axially adjusted without removing it from part 102. It is only necessary to loosen lock nut 112 and rotate part 103 to achieve the desired axial adjustment. This adjustment feature will provide an infinite number of adjusted positions, thus increasing the precision with which the mechanism can be set.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a shaft coupling mechanism, rotatably mounted input and output shafts, a clutch having an output element connected to said output shaft, an input clutch element movable axially between engaged and disengaged positions with respect to said output clutch element, frictional holding means for said input clutch element comprising a stationary member and at least one friction disc nonrotatably connected to said input clutch element and engaging said stationary member, resilient means urging said friction disc against said stationary member, means for adjusting the strength of said resilient means, and connecting means between said input shaft and input clutch element responsive to initial rotation of said input shaft from a neutral position with respect to said input clutch element to move said input clutch element into its engaged position and responsive to further rotation of said input shaft in the same direction to overcome said frictional holding means.

2. In a shaft coupling mechanism, rotatably mounted input and output shafts, a clutch comprising input and output clutch elements concentric with said input shaft, means operatively connecting said output clutch element to said output shaft, a sleeve rotatably mounted on said input shaft, frictional holding means for holding said sleeve against rotation, said frictional holding means comprising a stationary member surrounding said input shaft and a pair of axially movable friction discs keyed to said sleeve and engaging opposite sides of said stationary member, means keying together said input clutch element and sleeve, resilient means urging said input clutch element into disengaged position with respect to said output clutch element, a cam surface on said input clutch element, and a projection on said input shaft engageable with said cam surface, the cam surface and projection having a neutral position defining the disengaged position of said input clutch element, said cam being so shaped that initial rotation of said input shaft will cause said input clutch element to engage said output clutch element and further rotation of said output shaft will overcome said frictional holding means.

3. The combination according to claim 2, said stationary member comprising a radial bearing for said sleeve, and means for adjusting the force with which said friction discs are urged against said stationary member.

4. The combination according to claim 2, further provided with means for axially adjusting the position of said projection on said input shaft.

5. The combination according to claim 2, further provided with means for adjusting the strength of said resilient means urging said input clutch element into disengaged position.

6. In a shaft coupling mechanism, rotatably mounted input and output shafts, a clutch having input and output clutch elements concentric with said input shaft, said output clutch element being connected to said output shaft, said input clutch element comprising a sleeve having an aperture with an inclined surface, a pin carried by said input shaft and extending through said aperture, a second sleeve rotatably mounted on said input shaft, means keying together said sleeves to permit axial but prevent rotational movement therebetween, resilient means connecting said sleeves and urging said input clutch element sleeve away from said output clutch element, said pin and cam surface having a neutral position in which said clutch elements are disengaged, frictional holding means comprising a stationary member adjacent said second sleeve and at least one friction disc slidably but nonrotatably keyed to said sleeve, and resilient means urging said friction disc against said stationary member, said pin being responsive to initial rotation of said input shaft away from said neutral position to cam said input clutch element sleeve into engagement with said output clutch element and to further rotation of said input shaft in the same direction for overcoming said frictional holding means.

7. In a shaft coupling mechanism, rotatably mounted input and output shafts, a clutch having input and output clutch elements rotatably mounted on said input shaft, said output clutch element being connected to said output shaft, said input clutch element comprising a sleeve having at least one apertured portion with an inclined cam surface, a rod axially mounted in said input shaft, means for adjusting the axial position of said rod in said input shaft, a radially extending pin carried by said rod, an elongated apertured portion in said input shaft through which said pin extends, said pin extending further through said apertured portion in the input clutch element, means urging said input clutch element into disengaged position with respect to said output clutch element, means frictionally holding said input clutch element against rotation, said pin being responsive to initial rotation of said input shaft to cam said input clutch element into engaged position with respect to said output clutch element and responsive to further rotation of said input shaft in the same direction to overcome said frictional holding means.

8. The combination according to claim 7, the means for adjusting said rod in said input shaft comprising portions threadably connecting said input shaft and rod, said pin being removably mounted in said rod whereby said rod may be rotated to an adjusted axial position, and means for locking said rod in said position.

9. The combination according to claim 7, the means for adjusting said rod in said input shaft comprising a member coaxial with said rod and threadably mounted in said input shaft, a rotatable and non-slidable connection between said last-mentioned member and rod, and means for locking said last-mentioned member in its adjusted position.

References Cited by the Examiner

UNITED STATES PATENTS

| 541,712 | 6/95 | Blume | 192—100 |
| 1,159,663 | 11/15 | Guillery | 192—35 |
| 1,713,713 | 5/29 | Philips | 192—31 |
| 1,770,419 | 7/30 | McGarth | 192—41 |
| 2,555,215 | 5/51 | Warner | 192—35 |
| 2,861,225 | 11/58 | Mergen | 192—35 |
| 2,888,114 | 5/59 | Bostock | 192—49 XR |
| 3,108,669 | 10/63 | Ateliani | 192—8 |

FOREIGN PATENTS 854,773  11/60  Great Britain.

DAVID J. WILLIAMOWSKY, *Primary Examiner.*